United States Patent
Murra et al.

(10) Patent No.: US 11,889,053 B2
(45) Date of Patent: Jan. 30, 2024

(54) MULTI-CODEC PROCESSING AND RATE CONTROL

(71) Applicant: V-NOVA INTERNATIONAL LIMITED, London (GB)

(72) Inventors: Fabio Murra, London (GB); Ivan Damnjanovic, London (GB)

(73) Assignee: V-NOVA INTERNATIONAL LIMITED

(*) Notice: Subject to any disclaimer, the term of this patent is extended or adjusted under 35 U.S.C. 154(b) by 0 days.

(21) Appl. No.: 16/963,435

(22) PCT Filed: Jan. 17, 2019

(86) PCT No.: PCT/GB2019/050122
§ 371 (c)(1),
(2) Date: Jul. 20, 2020

(87) PCT Pub. No.: WO2019/141987
PCT Pub. Date: Jul. 25, 2019

(65) Prior Publication Data
US 2020/0344467 A1    Oct. 29, 2020

(30) Foreign Application Priority Data

Jan. 19, 2018 (GB) ...................... 1800934

(51) Int. Cl.
| | |
|---|---|
| *H04N 19/103* | (2014.01) |
| *H04N 19/146* | (2014.01) |
| *H04N 19/172* | (2014.01) |
| *H04N 19/184* | (2014.01) |

(52) U.S. Cl.
CPC ......... *H04N 19/103* (2014.11); *H04N 19/146* (2014.11); *H04N 19/172* (2014.11); *H04N 19/184* (2014.11)

(58) Field of Classification Search
CPC .. H04N 19/145; H04N 19/146; H04N 19/103; H04N 19/172; H04N 19/184
See application file for complete search history.

(56) References Cited

U.S. PATENT DOCUMENTS

| | | | | |
|---|---|---|---|---|
| 8,295,343 | B2* | 10/2012 | Tong | H04N 19/172 375/240.03 |
| 9,426,476 | B2* | 8/2016 | Lukasik | H04N 19/172 |
| 2003/0206558 | A1* | 11/2003 | Parkkinen | G10L 19/002 370/477 |
| 2004/0165783 | A1 | 8/2004 | Reynolds et al. | |

(Continued)

FOREIGN PATENT DOCUMENTS

WO    2017-142690    8/2017

OTHER PUBLICATIONS

International Search Report and Written Opinion for PCT/GB2019/050122 dated Apr. 18, 2019.

*Primary Examiner* — Kyle M Lotfi
(74) *Attorney, Agent, or Firm* — WORKMAN NYDEGGER (57) ABSTRACT

The bit rate for encoding a signal is controlled. The signal is encoded using at least two distinct encoding algorithms. An overall bit rate is allocated to at least two components of the signal. A first component of the signal is to be encoded using a first encoding algorithm. A second component of the signal is to be encoded using a second encoding algorithm.

22 Claims, 2 Drawing Sheets

(56) References Cited

U.S. PATENT DOCUMENTS

| | | | |
|---|---|---|---|
| 2004/0196907 A1* | 10/2004 | Mihara | H04N 19/126 |
| | | | 375/E7.218 |
| 2006/0140267 A1 | 6/2006 | He et al. | |
| 2010/0272170 A1* | 10/2010 | Hongo | H04N 19/124 |
| | | | 375/E7.026 |
| 2011/0216820 A1* | 9/2011 | Yang | H04N 19/00 |
| | | | 375/240.02 |
| 2012/0082219 A1* | 4/2012 | Sun | H04N 19/80 |
| | | | 375/E7.193 |
| 2014/0169454 A1 | 6/2014 | Berbecel et al. | |
| 2018/0077421 A1* | 3/2018 | Sablin | H04N 19/895 |

* cited by examiner

MULTI-CODEC PROCESSING AND RATE CONTROL

This application is a 371 U.S. Nationalization of PCT Application No. PCT/GB2019/050122, filed Jan. 17, 2019, which claims priority to Great Britain Application No. 1800934.0, filed Jan. 19, 2018, the disclosures of which are incorporated by reference herein in their entireties.

TECHNICAL FIELD

The present invention relates to apparatuses, methods, computer programs and computer-readable media. In particular, the present invention relates to apparatuses, methods, computer programs and computer-readable media for processing data. Processing data may include, but is not limited to, obtaining, deriving, outputting, receiving and reconstructing data.

BACKGROUND

Compression and decompression of signals is an important consideration in many known systems.

Many types of signal, for example video, audio or volumetric signals, may be compressed and encoded for transmission, for example over a data communications network. Other signals may be stored in a compressed form, for example on traditional storage medium such as a Digital Versatile Disc (DVD) or as data file in an online data storage (e.g., cloud storage).

There are many known techniques designed to efficiently compress and decompress signals. By way of example, for video signals there are standard-based Moving Pictures Expert Group (MPEG) compression techniques (such as AVC/H.264 or, more recently, HEVC/H.265), various compression techniques developed by Google® (e.g., VP8, VP9) and Microsoft® (e.g., VC1), as well as the novel family of hierarchical compression techniques developed by V-Nova® and known as PERSEUS®. In addition, there are several known compression techniques which are used in various fields for specific features, for example encoders which are optimised for recognising lines and encode them efficiently. As another example, for images and/or intra-frame video signals there are standard-based Joint Photographic Expert Group (JPEG) compression techniques (such as JPEG and JPEG 2000), lossless image compression techniques such as BMP, TIFF, PNG and others, as well as PERSEUS when used in an image or intra-frame mode.

Each of the above techniques is characterised by some specific features (e.g., the way data are processed, the type of data transforms used, the type of encoding technique used, etc.) which are largely responsible for determining the performance of the technique. An important factor in said performance is the number of symbols used to encode a data set or signal. In digital communication this typically equates to the number of bits (or any multiples thereof) utilised. When encoding large assets that are distributed over time, such as video for example, the allocation of these bits over time (the bit-rate) is of fundamental importance to ensure a distribution of symbols (bits) that provides the best possible data reconstruction, based on a given metric (e.g. quality of subjective experience). Each implementation of the above techniques uses its own and often bespoke rate control algorithm.

A typical bit rate control uses a given input video signal and a desired bit rate (e.g., constant or variable) to determine the encoder setting for maintaining the picture quality as high and constant as possible. The most important setting is typically the quantization step used in the encoding process.

Due to the specific features of each compression technique and the way the rate control is performed by the specific implementations of such techniques, an implementation of a compression technique may be better than others for certain video frames/sequences and worse than others for other video frames/sequences.

Video sequences are encoded with a specific compression technique implementation, leading to inefficiency in compression as not always the best technique is utilised for a video sequence.

SUMMARY

According to a first aspect of the present invention, there is a method for controlling the bit rate for encoding a signal, wherein the signal is encoded using at least two distinct encoding algorithms. The method may comprise allocating an overall bit rate to at least two components of the signal. The first component of the signal is to be encoded using a first encoding algorithm, and the second component of the signal is to be encoded using a second encoding algorithm. Further, the first component of the signal may be encoded with a first encoding algorithm and the second component of the signal may be encoded with a second encoding algorithm.

The method may further comprise determining an optimal value for a first bit rate to allocate for encoding the first component using the first encoding algorithm; and determining an optimal value for a second bit rate to allocate for encoding the second component using the second encoding algorithm. The optimal value for the first bit rate and the optimal value for the second bit rate may be jointly determined, for example by optimising a quality level for the signal. The optimal value for the first bit rate and the optimal value for the second bit rate may be jointly determined by optimising a cost function which comprises at least one characteristic of the first encoding algorithm and at least one characteristic of the second encoding algorithm. The process of optimizing may be performed under the constraint that the sum of the first bit rate and the second bit rate should be less or equal to the overall bit rate. The process of optimising may be performed by varying the at least one characteristic of the first encoding algorithm or the at least one characteristic of the second encoding algorithm. The process of optimising may be performed using a neural network or any suitable deep learning algorithm. The method may further comprise allocating the overall bit rate in part for the first component of the signal, in part for the second component of the signal, and in part for a third component of the signal, said third component to be encoded using a third encoding algorithm.

According to a second aspect of the present invention, there is provided a method for decoding an encoded signal, wherein the encoded signal has a first component encoded with a first encoding algorithm and a second portion encoded with a second encoding algorithm. The first decoding algorithm may be used to decode said first component and the second decoding algorithm may be used to decode said second component. Reconstructing the signal may be done by combining the decoded first component and decoded second component. The signal may be reconstructed by decoding only one of the components of the encoded signal.

The signal may comprise one or more sub-signals, wherein the first component and the second component are components of a same sub-signal. In a different embodiment, the signal may comprise multiple sub-signals, wherein the first component corresponds to one or more sub-signals, and the second component corresponds to one or more different sub-signals. The signal may be a video signal, and a sub-signal corresponds to a frame of said video signal. The signal may be one or more images, and a sub-signal corresponds to an image.

The above methods may comprise combining the components of the signal, once encoded, into a single encoded signal.

The above methods may further comprise separating the signal into two or more components, each to be encoded with a separate encoding algorithm.

The above methods may further comprise selecting an encoding algorithm from a set of encoding algorithms based on which encoding algorithm is best suited to encode a respective component of the signal.

In a third aspect of the present invention there is provided a method for decoding an encoded signal, the encoded signal having a first component encoded with a first encoding algorithm and a second component encoded with a second encoding algorithm, the method comprising decoding the first component using a first decoding algorithm; and reconstructing the signal using only the decoded first component.

In a fourth aspect of the present invention there is provided a transport stream comprising one or more data sets, wherein each of the data sets comprises at least a first component and a second component, said first component encoded using a first encoding algorithm and said second component encoded using a second distinct encoding algorithm.

In a fifth aspect of the present invention there is provided a rate control apparatus for controlling a bit rate of an encoded signal, wherein the signal is encoded using at least two distinct encoding algorithms, the apparatus configured to allocate an overall bit rate to at least two components of the signal, wherein a first component of the signal is to be encoded using a first encoding algorithm, and a second component of the signal is to be encoded using a second encoding algorithm.

In a sixth aspect of the present invention there is provided an encoding apparatus for encoding a signal using two distinct encoding algorithms, the apparatus configured to encode a first component of the signal with a first encoding algorithm and to encode a second component of the signal with a second encoding algorithm.

In a seventh aspect of the present invention there is provided a decoding apparatus for decoding an encoded signal, the encoded signal having a first component encoded with a first encoding algorithm and a second component encoded with a second encoding algorithm, the decoding apparatus configured to decode said first component with a first decoding algorithm and to decode said second component with a second decoding algorithm.

In an eighth aspect of the present invention there is provided a decoding apparatus for decoding an encoded signal, the encoded signal having a first component encoded with a first encoding algorithm and a second component encoded with a second encoding algorithm, the apparatus configured to decode the first component using a first decoding algorithm; and reconstruct the signal using only the decoded first component.

Further features and advantages will become apparent from the following description of preferred embodiments, given by way of example only, which is made with reference to the accompanying drawings.

DETAILED DESCRIPTION

For ease of reference, all the below figures are described using video signals as the signal to be compressed and decompressed. However, it is to be understood that the above invention applies equally to any type of signal which can be compressed, such as 1D signals (e.g., audio signals, etc.), 2D signals (e.g., images, video, etc.) and N-dimensional signals (e.g., volumetric signals, scans, space-time signals, medical imaging, etc.).

Figure 1:
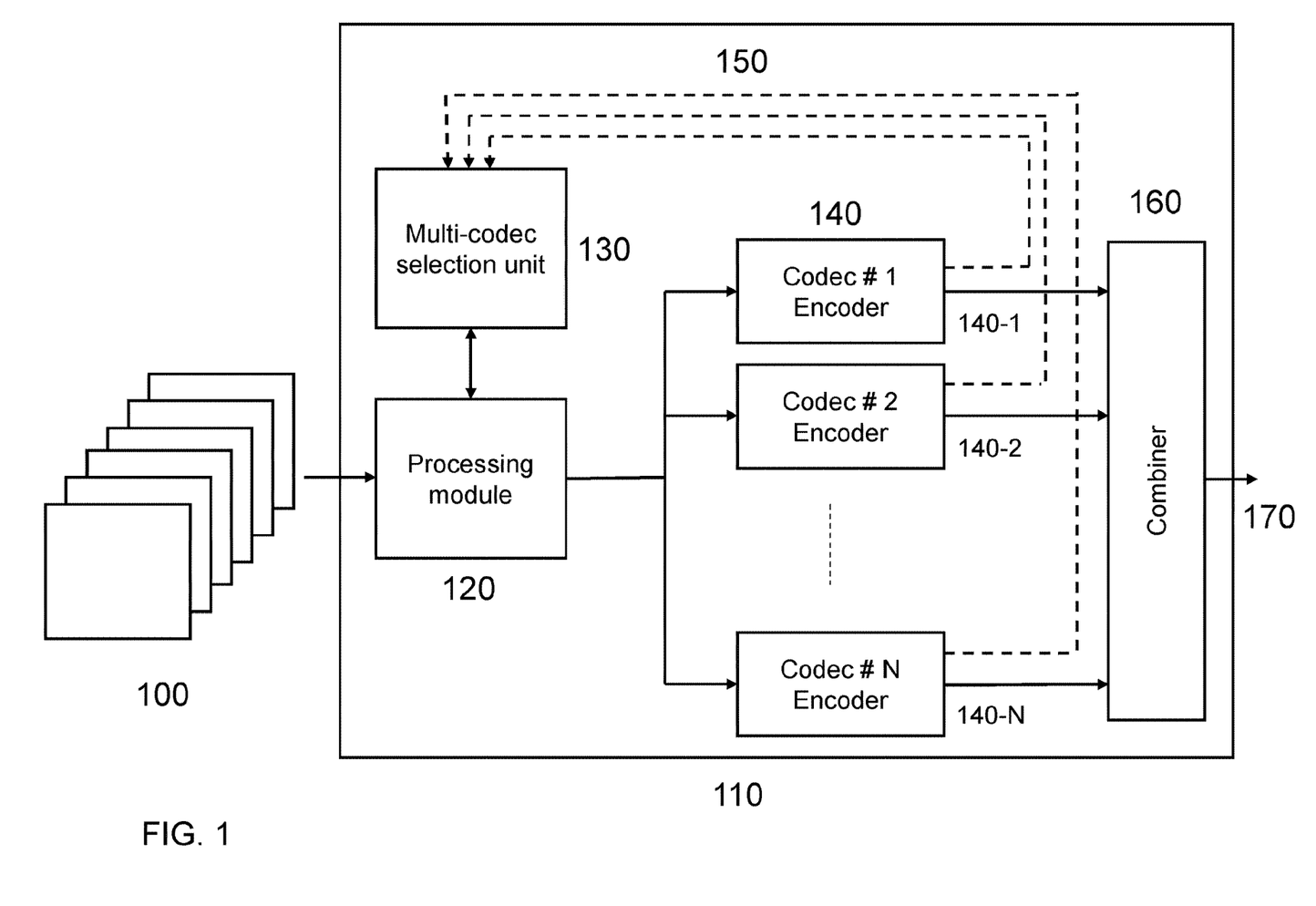
FIG. 1 shows a schematic block diagram of an example of a signal processing system in accordance with an embodiment of the present invention.

Referring to FIG. 1, there is shown an example of a signal processing system. A video sequence 100, composed of a series of uncompressed video frames, is fed into an encoding system 110 for compression. A processing module 120 communicates with a multi-codec selection unit 130 and a set of encoders 140.

Each of the encoders 140 is configured to encode a received stream of data according to a specific compression technique. For example, a first encoder 140-1 encodes the signal it receives according to a first compression technique (for example, AVC/H.264), a second encoder 140-2 encodes the signal it receives according to a second compression technique (for example, PERSEUS), an Nth encoder 140-N encodes the signal it receives according to an Nth compression technique (for example, VP9).

Multi-codec selection unit 130 is adapted to determine which encoders from the set of encoders 140 is to be used and what portion of an overall bit rate should be allocated to each of the selected encoders. The determination can be performed in various manners as further described below. Multi-codec selection unit 130 may also receive some feedback information (real-time or offline) 150 from the various encoders 140 in order either to improve the determination or to make the determination in the first place. Multi-codec selection unit 130 may also select one or more filtering operations to decompose a frame or a sequence of frames into multiple components, each component to be fed to a corresponding selected encoder.

Processing module 120 receives video sequence 100 and feeds said sequence to two or more of the encoders 140 according to information received from the multi-codec selection unit 130. For example, if joint rate control 130 informs processing module that first encoder 140-1 has been allocated 80% of the overall bit rate and the second encoder 140-2 has been allocated 20% of the overall bit rate, then processing module 120 manages the two encoders 140-1 and 140-2 so that the two encoders utilise the allocated bit rate when encoding their respective data stream.

Note that although processing module 120 has been drawn up as a separate module from multi-codec selection unit 130 in FIG. 1, the functions performed by these two components can be combined into a single module who performs the same or equivalent functions.

In one embodiment, the multi-codec selection unit 130 determines the encoders to select and the portion of bit rate to allocate to each of the selected encoders based on the relative strength of each encoder for a specific frame or series of frames in the video sequence. By way of example, the multi-codec selection unit 130 determines the overall bit rate to be allocated for a specific frame or series of frames in the video sequence. The overall bit rate may be selected, for example, based on the available bandwidth for transmitting the encoded video sequence (e.g., in a live streaming scenario), or based on specific requirements such as available storage capacity, required compressed file size, etc.

Further, based on one or more characteristics of each encoder in the set of encoders, the multi-codec selection unit 130 determines which of the encoders should be used to encode the specific frame or series of frames in the video sequence. The characteristics may be related to some attributes of the specific frame or series of frames in the video sequence.

For example, if a specific frame or series of frames in the video sequence contain sharp edges as well as areas with uniform colours, the multi-codec selection unit 130 may select an encoder implementing a compression technique that is suited to optimally encode such sharp edges alongside another encoder which implements a compression technique which is instead optimal to encode uniform areas of a picture, assign to each encoder an appropriate portion of the overall bit rate in order to optimise the encoding and then instruct processing module 120 to separate edges from uniform areas using a predetermined smart filtering operation. Processing module 120 applies the smart filtering operation to the specific frame or series of frames in the video sequence, thus decomposing the original specific frame or each of the frames in the series of frames in the video sequence into a first component containing edge information and a second component containing the remaining information. Processing module 120 may then feed for each frame the first component to a first encoder implementing a compression technique that is suited to optimally encode sharp edges and the second component to a second encoder implementing a compression technique which is instead optimal to encode uniform areas.

In another scenario, if a specific frame or series of frames in the video sequence are highly complex from a spatial perspective (e.g., there are a lot of details in the frame which means that the spatial correlation is low), the multi-codec selection unit 130 may select an encoder implementing a compression technique that is optimal for encoding high frequency information within a picture together with another encoder which implements a compression technique that is optimal for encoding the remaining information of the picture, assign to each encoder an appropriate portion of the overall bit rate in order to optimise the encoding, and then instruct processing module 120 to separate high frequency information using a predetermined filter operation. Processing module 120 applies the predetermined filter operation to the specific frame or series of frames in the video sequence, thus decomposing the original specific frame or each of the frames in the series of frames in the video sequence into a first component containing the high frequency information and a second component containing the remaining information. Processing module 120 may then feed for each frame the first component to a first encoder implementing a compression technique that is optimal for encoding the high frequency information and the second component to a second encoder implementing a compression technique which is instead optimal to encode the remaining information in the picture.

In another scenario, the multi-codec selection unit 130 may select an encoder implementing a compression technique that is suited to optimally encode a first colour component of a picture (e.g., the Y component), a second encoder implementing a compression technique that is suited to optimally encode a second colour component of a picture (e.g., the U component), and a third encoder implementing a compression technique that is suited to optimally encode a third colour component of a picture (e.g., the V component). Alternatively, it may select an encoder implementing a compression technique that is suited to optimally encode a colour component of a picture (e.g., the Y component) and a second encoder implementing a compression technique that is suited to optimally encode the remaining colour components of a picture (e.g., the U and V components). In either case, the multi-codec selection unit 130 may assign to each encoder an appropriate portion of the overall bit rate in order to optimise the encoding, and then instruct processing module 120 to separate the colour components using a predetermined filter operation. Processing module 120 applies the predetermined filter operation to the specific frame or series of frames in the video sequence, thus decomposing the original specific frame or each of the frames in the series of frames in the video sequence into a first colour component (e.g., Y), a second colour component (e.g., U) and a third colour component (e.g., V). Processing module 120 may then feed for each frame the first colour component to a first encoder implementing a compression technique that is optimal suited to optimally encode said first colour component, the second colour component to a second encoder implementing a compression technique that is optimal suited to optimally encode said second colour component, and the third colour component to a third encoder implementing a compression technique that is optimal suited to optimally encode said third colour component—or alternatively (in the event of the joint controller selecting only two encoders, one for the first colour component and a second for the second and third colour components) feed the second and third component to a second encoder implementing a compression technique that is optimal suited to optimally encode said second and third colour components.

In another scenario, the multi-codec selection unit 130 may select an encoder implementing a compression technique that is suited to optimally encode movement across multiple frames and another encoder implementing a compression technique that is suited to optimally encoding static portions within a frame. The multi-codec selection unit 130 may then assign to each encoder an appropriate portion of the overall bit rate in order to optimise the encoding, and then instruct processing module 120 to separate the movement components from the rest of the picture using a predetermined filter operation. Processing module 120 applies the predetermined filter operation to the specific frame or series of frames in the video sequence, thus decomposing the original specific frame or series of frames in the video sequence into a first component containing movement information and a second component containing the remaining information. Processing module 120 may then feed the first component to a first encoder implementing a compression technique that is optimal for encoding movement across multiple frames and the second component to a second encoder implementing a compression technique that is suited to optimally encoding static portions within a frame.

In one embodiment, the multi-codec selection unit 130 determines the encoders to be used from the set of encoders 140 and the portion of the overall bit rate to assign to each of the selected encoders based on optimising a cost function that takes into account (i) the portion of the overall bit rate to assign to each encoder and (ii) the tool sets, parameters and/or characteristics associated with the specific encoders implementing specific compression techniques (e.g., whether it is better suited for certain complexities, type of transforms used, spatial and/or temporal prediction, hierarchical approach, etc.). For example, the following equations could be used by the multi-codec selection unit 130:

$$R_{tot} = \sum_{j=1}^{N} R_j$$

$$R_j = g[T_{set}(enc\#1), T_{set}(enc\#2), \ldots, T_{set}(enc\#N)]$$

$$C = f[R_1, R_2, \ldots, R_N, T_{set}(enc\#1), T_{set}(enc\#2), \ldots, T_{set}(enc\#N), O_{image}, D]$$

where $R_j$ is the bit rate to be selected for the j-th encoder and is a function of the tool sets, parameters and/or characteristics of the various encoders implementing their respective compression technique (i.e., $T_{set}(enc\ \#j)$), and wherein the cost function C is a function of the possible bit rates to be selected, the tool sets/characteristics, some of the characteristics of the uncompressed specific frame or series of frames in the video sequence ($O_{image}$), as well as the distortion (D) which typically would need to be minimised. In one embodiment, the cost function used by the multi-codec selection unit 130 could be implemented using a neural network and/or a deep learning algorithm aimed at optimising the selection. Other functions and/or optimization techniques could be used without departing from the way the present invention works.

In one embodiment, once the processing module 120 has received information from the multi-codec selection unit 130 about (i) which of the set of encoders 140 should be used for encoding the specific frame or series of frames in the video sequence encoders (ii) what portion of the overall bit rate should be assigned to each of the selected encoders; and optionally (iii) the tool sets, parameters and/or characteristics to be used with each of the encoders, processing module 120 processes the specific frame or series of frames in the video sequence using the selected encoders according in a predetermined combined manner, by feeding one or more respective data streams to each encoder. Once the output of each decoder (i.e., encoded streams 140-1, . . . , 140-N) have been generated, combiner 150 combines them into a single combined stream 170 representing the compressed version of the input stream. There are various manners in which the streams can be combined. For example, the single combined stream could be combined into a combined format (e.g., a format that combines the encoded streams into a single bitstream). In a different example, the encoded streams could be combined by encapsulating the encoded streams into a bitstream where they are, effectively, still independent from each other even though they appear as a single encapsulated bitstream.

Although not shown, processing module 120 and/or combiner 160 can work in conjunction with encoders 140 to perform the encoding of the various components and generate the encoded components 140-1 to 140-N and the combined encoded stream 170. For example, some of the filtering operations performed by processing module 120 and/or the operations performed by the combiner 160 may be performed as part of the encoding process, i.e. when the encoders 140 encode the various components.

By way of non-limiting example, if the multi-codec selection unit 130 selects first encoder 140-1 (for example, implementing HEVC/H.265 compression technique) and second encoder 140-2 (for example, implementing a PERSEUS compression technique), the processing module 120 could first use the first encoder 140-1 to encode, using the portion of the overall bit rate allocated to the first encoder 140-1, a down sampled version of the specific frame or series of frames in the video sequence to produce a first encoded stream. After that, the processing module 120 could up sample a decoded version of the first encoded stream and feed it to the second encoder 140-2 together with the original specific frame or series of frames in the video sequence in order for the second encoder 140-2 to produce a second encoded stream using the portion of the overall bit rate allocated to the second encoder 140-2. A further description of such combination could be found, for example, in PCT patent publication no. WO 2014/170819 and PCT patent publication no. WO 2017/089839 which are incorporated herein by reference.

Figure 2:
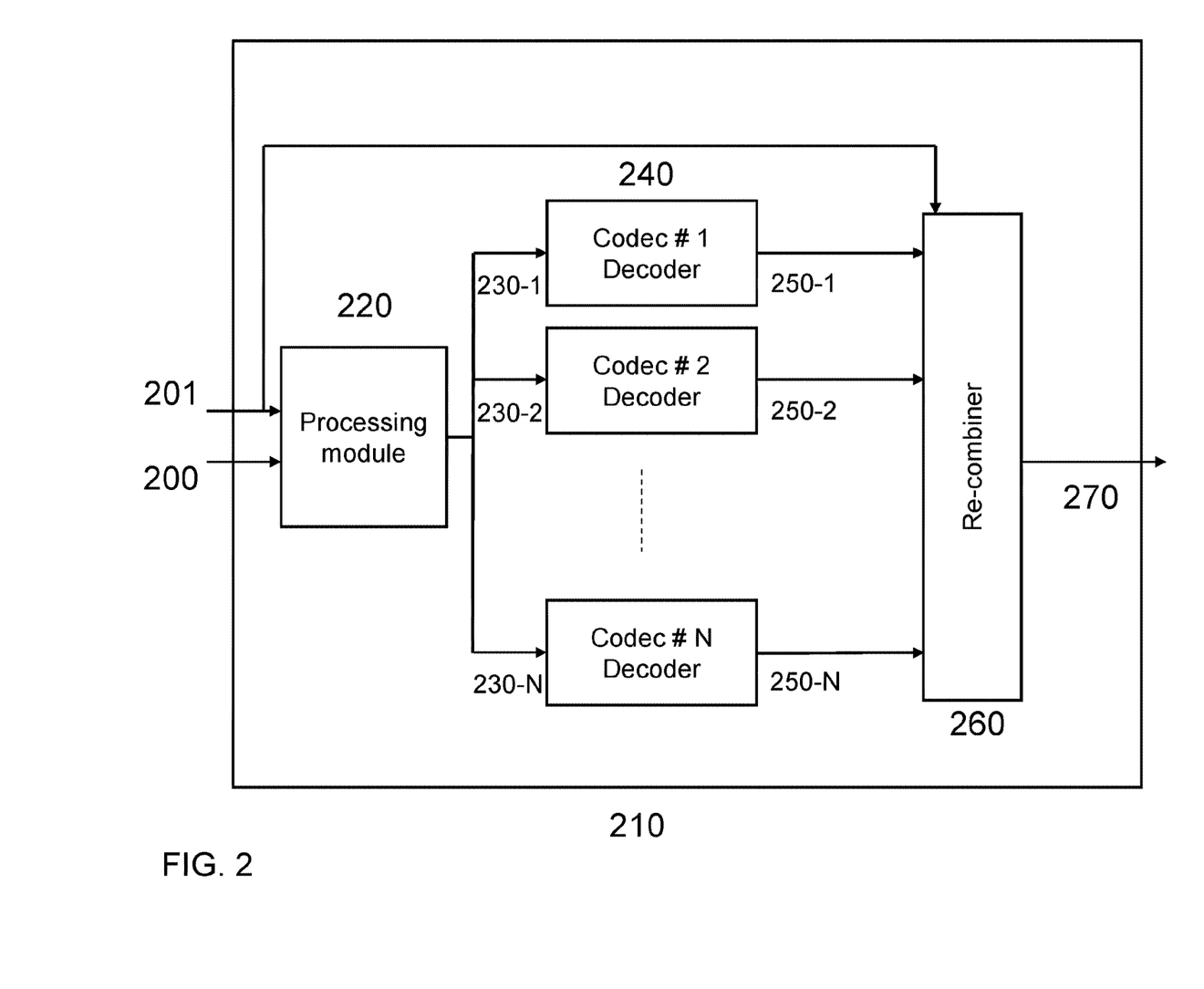
FIG. 2 shows a schematic block diagram of an example of a signal processing system in accordance with an embodiment of the present invention.

Referring to FIG. 2, there is shown an example of a signal processing system. An encoded sequence of frames 200, composed of a series of compressed video frames, is fed into a decoding system 210 for decompression. Processing module 220 receives the encoded sequence of frames 200 and separates it into multiple compressed components 230-1 to 230-N. Processing module 220 feeds the received multiple compressed components to corresponding decoders 240. Each of the decoders 240 decodes its corresponding compressed component into a decoded component 250-1 to 250-N. Re-combiner 260 then combines decoded components 250-1 to 250-N into a single decoded frame or sequence of frames 270.

Side information stream 201 may also be received by decoding system 210. Said side information stream 201 may include information about the number of multiple components, the specific filtering operations to apply to the sequence of frames as well as any other information needed to decode the sequence of frames. The side information stream 201 could be sent together with the encoded sequence of frames 200 in a single encoded bitstream or, alternatively, as a separate independent stream.

Processing module 220 separates the sequence based on the format of the encoded sequence of frames 200 and/or based on side information 201. Processing module 220 also selects a set of decoders 240 based on the specific decoding technique associated with the encoded components 230-1 to 230-N. For example, if processing module 220 receives two encoded components 230-1 and 230-2, and encoded component 230-1 requires a decoder which implements a decompressing technique suited for decoding sharp edges and component 230-2 requires a decoder implementing a decompression technique which is instead optimal to decode uniform areas, then processing module 220 selects a first decoder which implements a decompressing technique suited for decoding sharp edges and a second decoder which implements a decompression technique which is instead optimal to decode uniform areas, and produce decoded components 250-1 and 250-2. Processing module 220 may determine the set of decoders 240 to be selected based on the format of the encoded sequence of frames 200 and/or based on side information 201. For example, when it receives the encoded sequence of frames 200, processing module 220 may analyse the format of the sequence and, based on it, determine that there are two or more encoded components 230-1 to 230-N each of which requires a specific decoding algorithm in order to be decoded. Alternatively, or in conjunction, processing module 220 may receive information about the encoded components 230-1 to 230-N and the specific decoding algorithms to be used with each of them (including, for example, the parameters to set the decoding algorithms) via the side information stream 201.

Re-combiner 260 receives the decoded components 250-1 to 250-N and re-combines them to generate single decoded frame or sequence of frames 270. The combination may be performed based on the specific encoders 240 used during the process, or based on side information received from the side information stream 201. For example, if the decoded components include a first decoded component 250-1 which has been decoded by a decoder 240 which implements a decompressing technique suited for decoding sharp edges and a second decoded component 250-2 which has been decoded by a decoder implementing a decompression technique which is instead optimal to decode uniform areas, then re-combiner 260 may use a pre-determined filter suited to merge and/or combine the decoded components 250-1 and 250-2. For example, a simple filter implementation could simply be overlaying the decoded component 250-1 with the decoded component 250-2 to generate a single decoded stream 270.

Although not shown, processing module 220 and/or re-combiner 260 can work in conjunction with decoders 240 to perform the decoding of encoded components 230-1 to 230-N and generate the decoded components 250-1 to 250-N and the combined decoded stream 270. For example, some of the filtering operations performed by the re-combiner 260 and/or the operations performed by the processing module 220 may be performed as part of the decoding process, i.e. when the decoders 240 decode the various encoded components.

The above approach effectively receives an uncompressed frame (or uncompressed series of frames), decompose it into two or more components, allocate an overall available bit rate to corresponding two or more encoders, feed the two or more components to corresponding two or more encoders to generate two or more encoded components, and then combines the two or more encoded components into a single encoded stream which is then transmitted or stored for decoding at a later stage.

One of the advantages of the above approach is that two or more encoders (and the respective compression techniques they implement) can be effectively used contemporaneously on a decomposed version of the same original input stream in order to use the best possible combination of encoders and thus optimize the overall encoding performance of an encoding system. As discussed above, conventional encoding systems implements one compression technique at a time. There are various technical reasons for the above. First, each compression technique often requires dedicated hardware in order to perform the encoding process and therefore only one dedicated hardware is used. Second, as discussed above, each implementation requires a quite sophisticated rate control in order to manage the required bit rate for that implementation. Third, each compression technique has its own different syntax and bitstream, and therefore the encoding format is set to strictly comply with such syntaxes and bitstreams and does not allow for any deviation from those. By using the present invention, two or more compression techniques (for example, AVC/H.264 and PERSEUS, or "Y" encoder and "UV" encoder) can be used and their characteristics synergistically exploited so as to optimise the coding efficiency and maximise the quality of the encoding system for a given desired bit rate.

Another advantage of the present invention is the ability to optimise at a greater granularity the video encoded sequence. By multiplexing the encoders as the video sequence gets encoded, the best combination of compression techniques is selected for each frame, enabling the encoding system to always achieve the best achievable quality not just for the whole encoded sequence, but for each portion of the encoded sequence.

A further advantage of the present invention is the ability to enable retro-compatibility. For example, if the combined encoded sequence is encoded using AVC/H.264 and PERSEUS at a desired overall bit rate, legacy systems may still be able to decode the AVC/H.264 encoded sequence without the need to be able to decode the PERSEUS portion.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for controlling a bit rate for encoding a signal, wherein the signal is encoded using at least two distinct encoding algorithms, the method comprising:
receiving an uncompressed frame of the signal;
decomposing the uncompressed frame into at least two components, wherein the uncompressed frame is a single frame, and wherein decomposing the single frame into the at least two components is performed via a predetermined filter operation involving a filter, said filter being applied to the single frame;
allocating an overall bit rate to the at least two components of the signal, wherein:
a first component of the signal is to be encoded using a first encoding algorithm implemented by a first encoder, said first component being an unfiltered version of the single frame,
a second component of the signal is to be encoded using a second encoding algorithm implemented by a second encoder, said second component being a filtered version of the single frame,
a first feedback signal is directly provided from the first encoder to a selection unit that selects the first and second encoding algorithms, and
a second feedback signal is directly provided from the second encoder to the selection unit;
determining, by the selection unit and based on the first and second feedback signals, which portion of the overall bitrate is to be allocated to the first component and to the second component;
feeding the first component to the first encoding algorithm, wherein, as a result of the first encoding algorithm operating on the first component, the first encoding algorithm generates a first encoded component;
feeding the second component to the second encoding algorithm, wherein, as a result of the second encoding algorithm operating on the second component, the second encoding algorithm generates a second encoded component; and
transmitting or storing the first encoded component and the second encoded component.

2. The method of claim 1, further comprising:
using a first decoding algorithm to decode the first component; and
using a second decoding algorithm to decode the second component.

3. The method of claim 2, further comprising reconstructing the signal by combining the decoded first component and decoded second component.

4. The method of claim 1, wherein the signal comprises one or more sub-signals, and wherein the first component and the second component are components of a same sub-signal.

5. The method of claim 1, wherein the method further includes combining the first encoded component with the second encoded component to generate a single encoded stream.

6. The method of claim 5, wherein said transmitting or storing includes transmitting or storing the single encoded stream.

7. The method of claim 1, wherein the signal comprises multiple sub-signals, and wherein the first component corresponds to one or more sub-signals, and the second component corresponds to one or more different sub-signals.

8. The method of claim 1, further comprising:
   determining an optimal value for a first bit rate to allocate for encoding the first component using the first encoding algorithm; and
   determining an optimal value for a second bit rate to allocate for encoding the second component using the second encoding algorithm;
   wherein the optimal value for the first bit rate and the optimal value for the second bit rate are jointly determined.

9. The method of claim 8, wherein the optimal value for the first bit rate and the optimal value for the second bit rate are jointly determined by optimizing a quality level for the signal.

10. The method of claim 9, wherein the optimal value for the first bit rate and the optimal value for the second bit rate are jointly determined by optimizing a cost function which comprises at least one characteristic of the first encoding algorithm and at least one characteristic of the second encoding algorithm.

11. The method of claim 10, wherein the process of optimizing is performed under a constraint that a sum of the first bit rate and the second bit rate should be less or equal to the overall bit rate.

12. The method of claim 10, wherein the process of optimizing is performed by varying the at least one characteristic of the first encoding algorithm or the at least one characteristic of the second encoding algorithm.

13. The method of claim 1, wherein the signal can be reconstructed by decoding only one of the components of the encoded signal.

14. The method of claim 1, wherein said determination for portioning the overall bitrate is further based on optimizing a cost function that takes into account characteristics associated with the first and second encoders, and wherein the selection unit implements the cost function using a neural network and/or deep learning algorithm aimed at optimizing said determination.

15. The method of claim 1, the method further comprising:
   decoding the first component using a first decoding algorithm; and
   reconstructing the signal using only the decoded first component.

16. The method of claim 1, wherein the feedback, which is provided from the set of encoders, is further relied on to determine which specific encoders from the set of encoders are to be subsequently used when encoding data.

17. A rate control apparatus for controlling a bit rate of an encoded signal, wherein the signal is encoded using at least two distinct encoding algorithms, the apparatus configured to:
   receive an uncompressed frame of the signal;
   decompose the uncompressed frame into at least two components, wherein the uncompressed frame is a single frame, and wherein decomposing the single frame into the at least two components is performed via a predetermined filter operation involving a filter, said filter being applied to the single frame;
   allocate an overall bit rate to the at least two components of the signal, wherein:
      a first component of the signal is to be encoded using a first encoding algorithm implemented by a first encoder, said first component being an unfiltered version of the single frame,
      a second component of the signal is to be encoded using a second encoding algorithm implemented by a second encoder, said second component being a filtered version of the single frame,
      a first feedback signal is directly provided from the first encoder to a selection unit that selects the first and second encoding algorithms, and
      a second feed signal is directly provided from the second encoder to the selection unit;
   determine, by the selection unit and based on the first and second feedback signals, which portion of the overall bitrate is to be allocated to the first component and to the second component;
   feed the first component to the first encoding algorithm, wherein, as a result of the first encoding algorithm operating on the first component, the first encoding algorithm generates a first encoded component;
   feed the second component to the second encoding algorithm, wherein, as a result of the second encoding algorithm operating on the second component, the second encoding algorithm generates a second encoded component; and
   transmit or store the first encoded component and the second encoded component.

18. The rate control apparatus of claim 17, wherein the first encoding algorithm implemented by the first encoder is associated with a first syntax and the second encoding algorithm implemented by the second encoder is associated with a second syntax that is different from the first syntax.

19. A method for controlling a bit rate for encoding a signal, wherein the signal is encoded using at least two distinct encoding algorithms, the method comprising:
   decomposing an uncompressed frame of a signal into at least two components, wherein the uncompressed frame is a single frame, and wherein decomposing the single frame into the at least two components is performed via a predetermined filter operation involving a filter, said filter being applied to the single frame;
   allocating an overall bit rate to the at least two components of the signal, wherein:
      a first component of the signal is to be encoded using a first encoding algorithm implemented by a first encoder,
      the first component is an unfiltered version of the single frame,
      a second component of the signal is to be encoded using a second encoding algorithm implemented by a second encoder, and
      the second component is a filtered version of the single frame;

causing a first feedback signal to be directly provided from the first encoder to a selection unit;

selecting, using the selection unit, the first and second encoding algorithms;

causing a second feedback signal to be directly provided from the second encoder to the selection unit; and determining, by the selection unit and based on the first and second feedback signals, which portion of the overall bitrate is to be allocated to the first component and to the second component.

20. The method of claim 19, wherein said determination for portioning the overall bitrate is further based on optimizing a cost function that takes into account characteristics associated with the first and second encoders, and wherein the selection unit implements the cost function using a neural network and/or deep learning algorithm aimed at optimizing said determination.

21. The method of claim 19, wherein a selection of what specific bit rate is to be used as the overall bit rate is based on a determined storage capacity availability.

22. The method of claim 19, wherein the predetermined filter operation includes a down sampling operation.

\* \* \* \* \*